United States Patent [19]
Baughman et al.

[11] 3,812,919
[45] May 28, 1974

[54] CHISEL PLOW

[76] Inventors: Herbert W. Baughman, Vermont; Harry G. Yetter, Colchester, both of Ill. 61484

[22] Filed: June 1, 1973

[21] Appl. No.: 366,152

Related U.S. Application Data

[63] Continuation of Ser. No. 225,180, Feb. 10, 1972, abandoned.

[52] U.S. Cl. ............... 172/328, 172/417, 280/414.5
[51] Int. Cl. ..................... A01b 59/00, A01b 65/06
[58] Field of Search ........................... 172/326–328, 172/417, 423; 280/414.5

[56] References Cited
UNITED STATES PATENTS

| | | | |
|---|---|---|---|
| 2,625,090 | 1/1953 | Pursche | 172/328 X |
| 2,767,538 | 10/1956 | Scheidenhelm | 172/328 X |
| 3,174,557 | 3/1965 | Newkirk | 172/417 X |
| 3,292,714 | 12/1966 | Tsuchiya et al. | 172/328 X |
| 3,321,029 | 5/1967 | Morkoski et al. | 172/328 |
| 3,658,362 | 4/1972 | Fackler et al. | 172/328 X |

*Primary Examiner*—Robert E. Pulfrey
*Assistant Examiner*—Paul T. Sewell
*Attorney, Agent, or Firm*—Mann, Brown McWilliams & Bradway

[57] ABSTRACT

A rigid wheeled frame supporting or carrying gang type, earth-engaging and working chisel or shovel plow, wherein the wheel mounts are vertically adjustable and lockable in adjusted position with relation to a traversed surface or earth to be, or being worked, and cultivated; the frame, in all positions of vertical adjustment being maintained level and the draft-tongue of the wheeled frame concurrently automatically adjusted to compensate for effected changes in the particular height adjustment of both the frame and earth-working devices carried thereby, thus assuring proper hitching to, and towing, by a tractor or other draft vehicle with the frame and earth-working devices level, when active and/or inactive, when traveling to or from a cultivating project over a rough or uneven way and having adjustable brackets providing multiple mounts for supporting a plurality of cultivating devices at equally spaced intervals.

3 Claims, 6 Drawing Figures

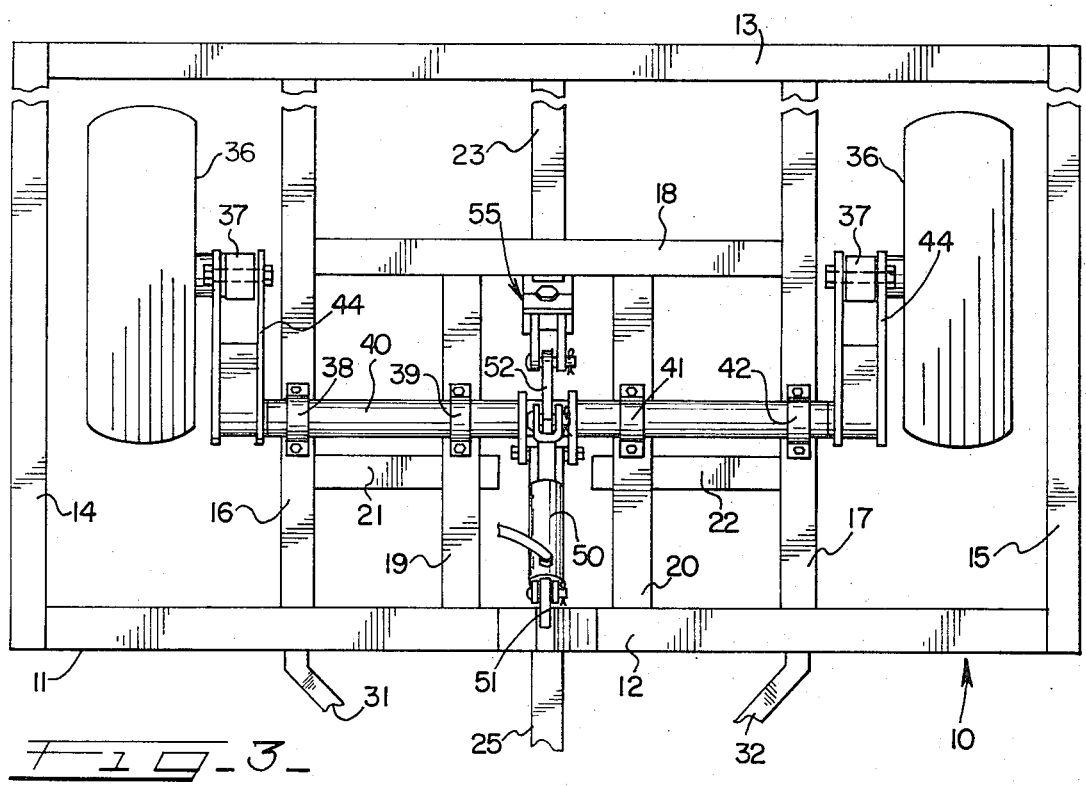
Fig-3-
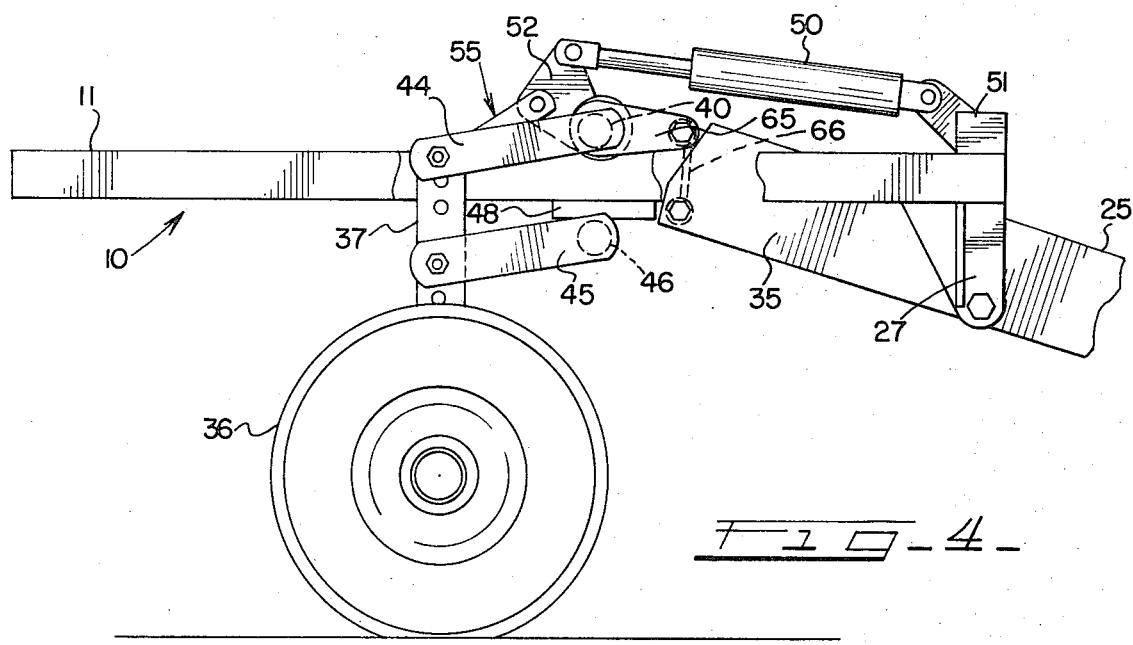
Fig-4-

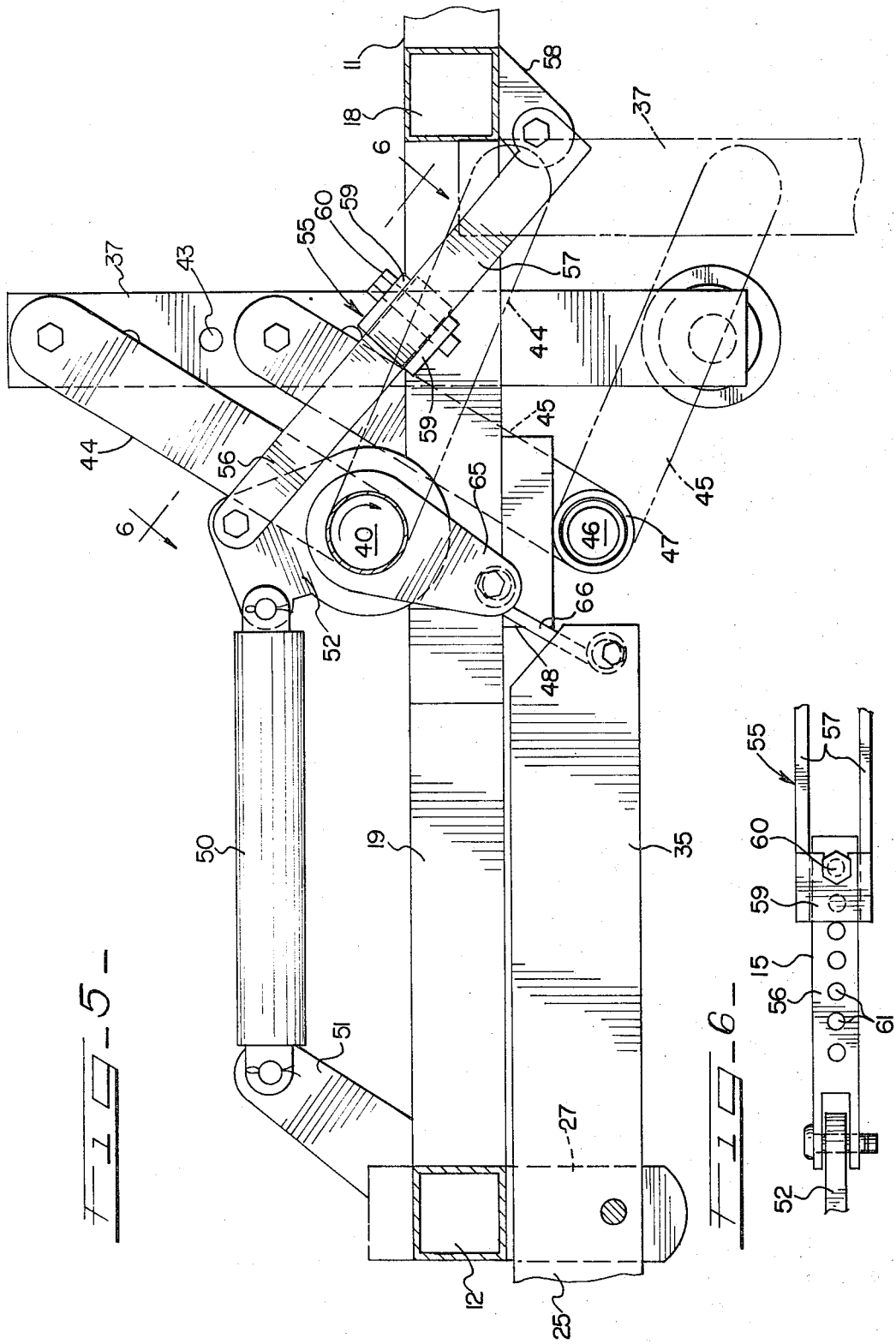

CHISEL PLOW

This is a continuation, of application Ser. No. 225,180, filed Feb. 10, 1972 now abandoned.

FIELD OF THE INVENTION

This invention relates, generally, to improvements in wheeled plows or cultivators, particularly, to the wheel-equipped rigid frame type, carrying a multiplicity of appropriate earth-working and cultivating devices, as for example, so-called chisel or shovel plows, etc., provided with vertically adjustably rotary crank-axle operated wheel mounts and cultivator carrying frame.

BACKGROUND OF THE INVENTION

In the field of agriculture, specifically, in cultivation of the soil of fields, wheeled cultivators or tillage devices are frequently required to travel to and from their places of normal storage to and from areas or fields to be cultivated, over rough and uneven surfaces rendering it beneficial, if not necessary, that the cultivating devices carried thereby shall be supported thereon so that they will be prevented from contact or engagement with the traversed surfaces lest they be damaged or impede travel; also, that the bodies or frames thereof shall be maintained in substantially level relation to the surface being traversed and to the towing tractor or other draft means at heights fully sufficient to prevent the aforesaid detrimental contact or engagement of the cultivating devices with the surfaces of the traversed ways or obstacles encountered during crossing, as well as assure a maximum effective towage plus effective vertical adjustment of the carried earth-working devices to the required soil-working or cultivating depths.

While attempts have heretofore been made to eliminate or obviate these difficulties and to comply with and assure the stated requirements, and earth tilling efficiencies, they have insofar as I am aware, been generally unsuccessful, if not impractical.

SUMMARY OF THE INVENTION

In order to eliminate the above, the present invention has evolved. It is characterized, firstly, in that it provides a novel mechanism for selectively and automatically raising or lowering its body frame to the desired or required height; secondly, it retains the frame in level or substantially level relation to the ground or other surface; thirdly, the cultivating or tilling devices will be carried in effective working or non-working relation to the soil, as for example, said devices may be vertically and selectively adjusted so that they will engage and till the field soil to the required depth in equally spaced relationship and, when traveling to or from a field site, will be prevented from contacting irregular traversed surfaces with resultant damage thereto; fourthly, it provides a novel construction of wheel lift concurrently operable with the operation of the first characterization so that the raising and/or lowering of said frame will be effected, and fifthly, the draft-tongue connecting the wheeled frame and cultivating devices to a tractor or other draft means will be automatically adjusted to compensate for the raising or lowering of said frame with relation thereto, hence, assuring satisfactory towing effectiveness.

OBJECTS OF THE INVENTION

It is an important object of the invention to provide an automatically operable leverage arrangement and construction by means of which the earth-working means carried by the wheeled carriage can be adjusted vertically to a particularly desired height and so retained whereby to effect their depth of engagement with the field soil being cultivated, to the required or desired extent.

It is also an object of the invention to provide laterally adjustable brackets on the frame of the earth-working apparatus adapted to secure cultivating devices in multiple at each bracket and provide for vertical adjustment of at least one of such devices at each bracket and with the several devices spaced at equal intervals and the multiple devices at each bracket in alignment.

DESCRIPTION OF THE DRAWINGS

Other and equally important advantages, benefits, and objectives of the invention will be apparent from a reading and an understanding of the following description in connection with the accompanying drawings, wherein:

FIG. 3 is a plan view of the plow arrangement and vertical adjustment mechanism;

FIG. 4 is a detai view of the lift mechanism illustrating the raised position;

FIG. 5 is also a detail view of the lift mechanism but to larger scale illustrating the lowered position and indicating the raised position in broken lines; and FIG. 6 is a detail view taken from the lines 6—6 of FIG. 5 showing the telescopic motion limiting device providing a limit stop to rotation of the crank axle when lowering the frame.

DESCRIPTION OF PREFERRED EMBODIMENT

Figure 1:
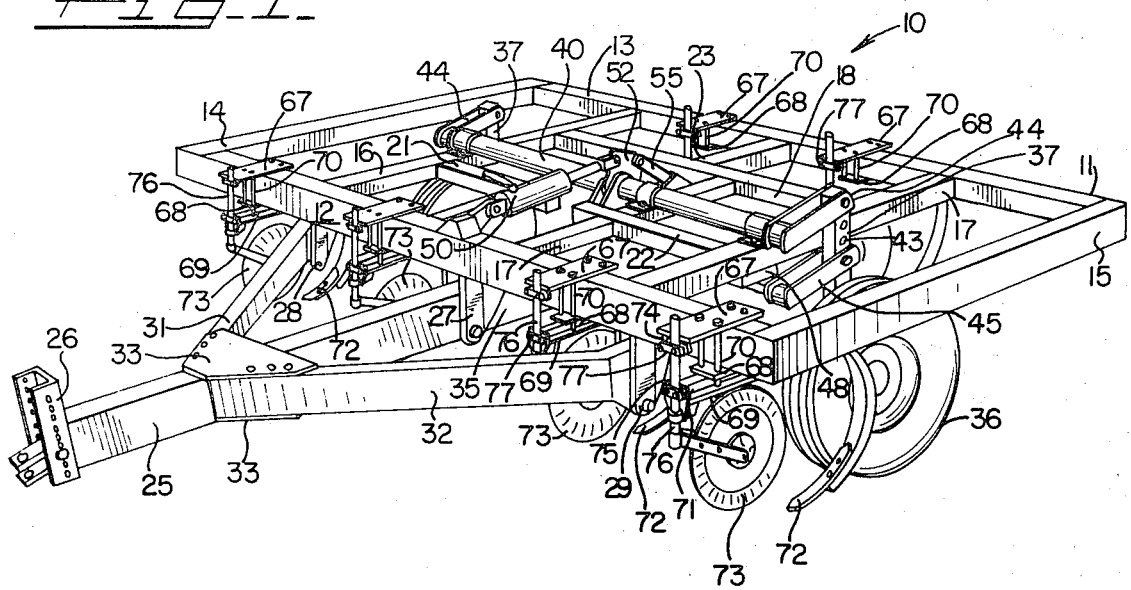
FIG. 1 is a general perspective view of a gang type plow arrangement constructed in accordance with this invention and incorporating colter and chisel type cultivator devices.
Figure 2:
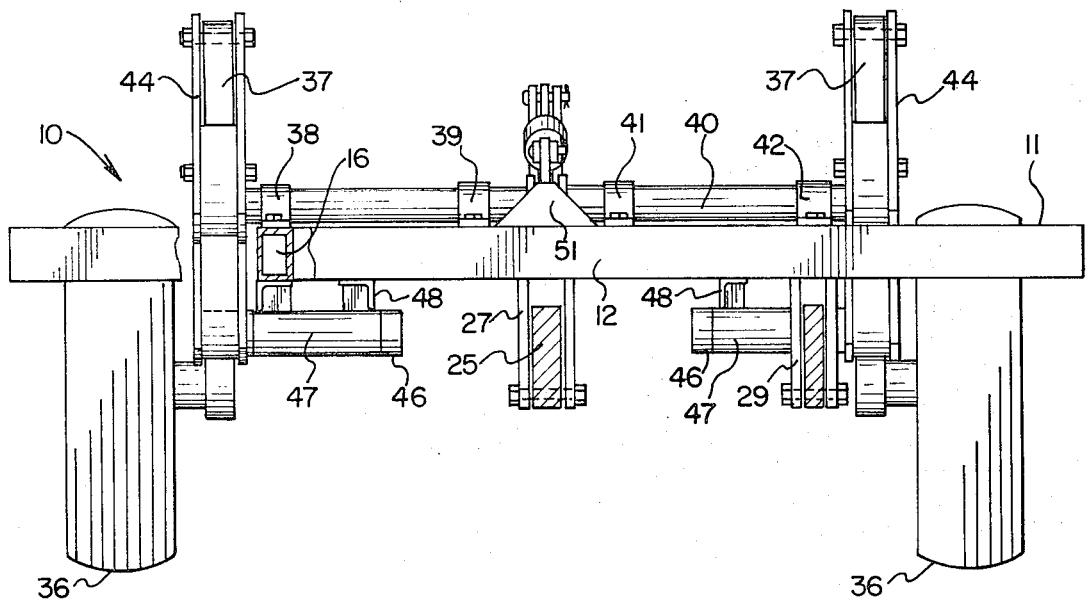
FIG. 2 is a front elevational view to enlarged scale with portions broken away and showing the vertical adjustment mechanism.

In the drawings 10 represents generally a gang type cultivator or plow having a rigid frame 11 including transverse members 12 and 13 connected by longitudinal frame members 14 and 15 at the respectively opposite sides and intermediate longitudinal members 16 and 17. An intermediate transverse frame member 18 connects the longitudinals 16 and 17. Longitudinal members 19 and 20 extend between the member 18 and the transverse member 12. These members 19 and 20 are connected by means of short intermediate transverse framing members 21 and 22 to the intermediate longitudinal frame members 16 and 17 respectively. A short longitudinal member 23 connects the frame members 13 and 18. The structure thus described provides a rigid frame for mounting the cultivator devices and raising and lowering mechanisms and enables the cultivator devices to be mounted in relation to the frame structure such that the cultivators are equally spaced laterally to break the soil in equally spaced rows and avoid forces tending to exert a pull in a sidewise direction.

A drawbar or draft tongue 25, having an adjustable hitch or tow-bar connection 26 at its front end, is pivotally mounted on the rigid frame 11 by means of depending brackets 27, at the center, and 28 and 29 at laterally spaced points secured at the underside of the transverse frame member 12. The structure of the drawbar includes the central longitudinal draft tongue 25, which is pivotally carried in the central depending bracket 27, and angularly disposed struts 31 and 32, secured at thie converging ends to the draft tongue 25 at a point behind the front hitch 26 by means of upper and lower gussets 33. The struts 31 and 32 extend respectively at an angle to the depending brackets 28 and 29 where they are pivotally supported, thus bracing the draft tongue 25 against lateral deflection and providing three spaced points of support for the draft tongue structure with the pivotal connections at the brackets, 27, 28 and 29 all on the same axis. The draft tongue 25 has an integral extension 35 extending rearwardly of its pivotal connection to the supporting bracket 27.

Supporting wheels 36 are mounted on hubs carried by wheel mounts 37 which are disposed vertically at all times. The rigid frame 11 is carried on the wheel mounts 37 and is so mounted as to provide for vertical adjustment relative to the ground. A transversely extending rotatable crank axle 40 is mounted on the longitudinal frame members 16, 19, 20 and 17 by means of bearing brackets 38, 39, 41 and 42 which rigidly support the crank axle in the rigid frame 11 for rotary motion only. At respectively opposite ends of the crank axle 40 a parallel link assembly 44 is rigidly fixed to the axle for movement therewith when the axle is rotated. The free end of each of these link assemblies is pivotally connected with the respective wheel mounts 37 so that when the crank axle is rotated the frame 11 is moved upwardly or downwardly relative to the ground supporting the wheels 36.

The wheel mounts 37 are maintained vertical and the frame 11 in a generally horizontal level condition through the medium of a second pair of parallel links 45 pivotally connected at their free ends to the wheel mounts 37 and at their inner ends pivotally mounted on the rigid frame 11. The links 45 are disposed parallel to the links 44 so that the pair of parallel links at the respective wheel mounts 37 function like a parallelogram to maintain their wheel mounts vertical and thus keep the rigid frame 11 horizontally level. The links 45 at their respective inner ends are rigidly mounted in a relatively short axle 46 which is rotatively supported in bearing brackets 47 carried by angle bracket structures 48 rigidly secured at the underside of frame structure 11. The pivotal axis of the axles 46 carrying the links 45 is located directly on the vertical centerline with the crank axle 40 so that with all of the links 44 and 45 being of the same length a true parallelogram effect is obtained. The wheel mounts 37 may be positioned initially relative to the frame 11 by means of holes 43 which enable adjustment of the wheel mounts by positioning the parallel links 44 and 45 for pivotal connected to the pair of holes in each mount dictated by the desired relative positioning of the frame 11 and wheels 36.

The crank axle 40 is rotated by power means comprising a hydraulic cylinder mechanism 50 having communication with a suitable source of hydraulic pressure means. The cylinder end of this mechanism is pivotally mounted on a bracket structure 51 rigidly fixed to the transverse frame member 12 at its upper side thus forming an abutment against which the cylinder mechanism reacts in operating The plunger end of the cylinder mechanism is pivotally connected to an upper crank arm 52 rapidly mounted on the crank axle 40 which thus rotates the crank axle according to the direction of actuation of the cylinder mechanism 50. A stop device is provided to limit the rotation of the crank axle and associated devices in the direction of operation which lowers the frame 11 relative to the wheels 36 and supporting ground surface. This stop device is best illustrated in FIGS. 5 and 6 and comprises a telescoping link mechanism generally designated 55. One end link member 56 of this device is pivotally connected to the upper crank arm 52 on crank axle 40 while the opposite end structure 57, adapted to receive and embrace the end link 56 in telescoping relation, is pivotally mounted on a bracket 58 rigidly secured to the underside of the transverse frame member 18. End structure 57 is comprised of a pair of spaced links connected at the one end to the bracket 58 and at the end embracing the link 56 a pair of upper and lower plate members 59 rigidly connect the link members to form what might be described as a socket or opening for the reception of the link 56 into the link structure 57. These upper and lower plates 59 are recessed, as best shown in FIG. 6, and a pin 60 fixed in the link 56 after it has been entered into the link structure 57, engages the recess to limit relative movement of members 56 and 57 in an outward direction. Thus the rotation of crank axle 40 in the direction tending to extend this stop device 55 is stopped upon the pin 60 entering the recess in plates 59 and this has the effect of limiting the lowering movement of the rigid frame 11 and all of the appurtenances mounted thereon. However, the degree of limitation of this movement is adjustable by means of the plurality of openings 61 provided in the link 56 for mounting the pin 60 in any of the openings according to the amount of travel desired as dictated by the amount of vertical adjustment required to position the frame 11 in accordance with operating conditions.

Means are provided automatically to compensate for changes in the operating height of the rigid frame 11 in respect to adjustment of the draft tongue 25 whereby to position the draft tongue for proper hitching relation and connection to a towing vehicle. The rearward extension 35 is adapted to be fulcrumed about the supporting pivot bracket 27 automatically for this purpose when the crank axle 40 is rotated. The crank axle 40 is provided with a lower crank arm 65 rigidly mounted thereon and rotatable therewith. A connecting link member 66 extends between and is pivotally mounted at its respectively opposite ends on the lower crank arm 65 adjacent its free end and on the rearward extension 35 of the draft tongue 25 adjacent the rearend thereof and near the bottom of the extensions. Thus, when the crank axle 40 is rotated to position, the frame 11, as desired, the draft tongue 25 is automatically and simultaneously adjusted to position the tongue for proper draft connection to the towing vehicle.

A plurality of cultivating devices is mounted on the rigid frame 11 for tilling and cultivating soil in the operation of the earth working apparatus. A bracket mounting arrangement for the cultivating device is designed to accommodate two types of cultivators and is adjustable laterally on the frame 11 for proper positioning of the cultivators and in equally spaced relationship transversely of the frame structure. These brackets are each adapted to mount both a rolling colter type disc cultivator and a chisel type plow or cultivator. As best shown in FIG. 1, the brackets comprise upper and lower clamping plate members 67 and 68 and a third clamping plate 69 spaced below the lower clamping plate 68 and a plurality of clamping bolts 70. The horizontal bar portion 71 of a curved mounting bar for a chisel plow or cultivator 72 is mounted between the clamp 68 and the clamp plate 69 and when the bolts 70 are tightened the plates 67 and 68 are clamped on the transverse frame member 12 or 13, as the case may be, and the chisel plow mounting bar portion 71 is clamped between the lower clamp plate 68 and the third clamp plate 69 so that the entire assembly is thus rigidly mounted on the transverse frame member.

The upper clamp plate 67 and the third clamp plate 69 are also adapted for the mounting of the rolling colter plow or cultivating disc 73 in alignment with the chisel plow 72. The plates 67 and 69 are each provided with a vertically disposed front plate 74 and 75, respectively, rigidly secured thereto and in vertical alignment. The plates 74 and 75 thus afford clamping surfaces in the same plane to which the vertical bar 76 of the colter plow is adapted to be clamped. Clamp plates 77 are engaged over the bar 76 at each bracket and secured tightly by drawing up the bolts provided for that purpose.

From the foregoing it will be seen that a cultivating apparatus has been provided wherein simple and effective means enable quick and positive adjustment of the rigid frame upwardly and downwardly between raised positions for travel to and from operating locations and a lowered operative position for tilling soil at such locations. The raised portion of the frame lifts the cultivating devices clear of any ground obstructions for free travel between the operating locations while the lowered position locates the cultivating devices in proper relation to the soil to be tilled. The tow bar for the cultivating apparatus is automatically positioned for proper hitch connection to a towing vehicle where the frame is raised for towing. The cultivating devices are adjustably mounted on the fixed frame by means of brackets affording multiple mounts for a plurality of cultivating devices on each bracket. Finally, limit means are provided to control the positioning of the frame and tilling devices with respect to the depth of penetration into the soil to be utilized during tilling operations.

It is important to note that the design of the lifting mechanism of this invention is such that the chisel plows are maintained at an even depth at all times and in respect to the depth of fertilizers. As an example, with the chisel plows set for operation at a depth of 10 inches in a particular type of soil, if another type of soil is encountered such that the tractor pulling the plow is incapable of pulling it at the ten inch depth it becomes necessary to raise the chisel plows to a depth of six inches. In these circumstances, all of the chisel plows would continue to operate at an even depth, both front and rear, at the adjusted depth of six inches. This is very important particularly with certain fertilizers where with this arrangement the fertilizer would continue at an even depth and thus keep gas sealed in the soil.

What is claimed is:

1. An earth working apparatus having a rigid frame mounted on supporting wheels and carrying a plurality of earth working devices, a draft tongue having a pivotal mounting on said frame adapted to be hitched to a towing vehicle, said draft tongue having an extension thereof inwardly of said frame beyond said pivotal mounting, a vertically disposed wheel mount for each of said supporting wheels, a rotary crank axle mounted transversely on said frame having a horizontal axis, a longitudinally extending link connecting each of said wheel mounts with said rotary crank axle, said links each comprising a crank arm operative from said crank axle, a second longitudinally extending link vertically spaced relative to each of the first links, said second links being parallel to the first links and of the same length as the first links and respectively connecting said wheel mounts with a respectively associated axle mounted on said frame having a horizontal axis in vertical alignment with the axis of said rotary axle whereby said respective wheel mounts are constrained to vertical movement in respectively vertical positions throughout their extent of travel between raised and lowered positions, power means to rotate said crank axle whereby said first links comprise laterally spaced crank arms to impart vertical movement of the wheel mounts, said second links acting to maintain the vertical position of each wheel mount during movement between said raised and lowered positions, an upper crank arm provided on the crank axle disposed intermediate said first links, said power means having operative engagement at one end thereof with said upper crank arm to rotate the crank axle, a pivotal connection at the opposite end of the power means on said frame, a telescoping link connection extending between said upper crank arm and said frame to limit rotation of the crank axle in a direction that lowers the frame relative to said wheel mounts to fix the operating height of said earth working devices for the operations of said apparatus, a depending crank arm centrally disposed on said crank axle, and a link connecting said depending crank arm with said inward extension of said draft tongue to compensate for adjustments in height of the frame to effect normal hitching to said towing vehicle and maintain the frame and draft tongue substantially level upon rotation of the crank axle.

2. An earth working apparatus as set forth in claim 1 wherein said power means comprises a hydraulically actuated cylinder mechanism, and said telescoping link connection includes adjustable stop means whereby the limit of rotation of the crank axle may be varied to position said frame in accordance with said earth working operations.

3. An earth working apparatus as set forth in claim 1 wherein said second links are independent of each other at opposite sides of the frame and said respectively associated axles are spaced apart axially and independently of each other at opposite sides of the frame, and respectively associated pivot bearings mounting said axles at each side on the frame.

* * * * *

UNITED STATES PATENT OFFICE
CERTIFICATE OF CORRECTION

Patent No. 3,812,919          Dated  May 28, 1974

Inventor(s)  Herbert W. Baughman and Harry G. Yetter

It is certified that error appears in the above-identified patent and that said Letters Patent are hereby corrected as shown below:

Column 1, line 12, "adjustably" should be --adjustable--; Column 2, line 36, "detai" should be --detail--; Column 3, line 10, "thie" should be --their--; Column 3, lines 59 and 60, "connected" should be --connection--; Column 4, line 3, "operating" should be --operation.--; Column 4, line 5, "rapidly" should be --rigidly--.

Signed and sealed this 8th day of October 1974.

(SEAL)
Attest:

McCOY M. GIBSON JR.
Attesting Officer

C. MARSHALL DANN
Commissioner of Patents